United States Patent [19]

Lighthipe, Jr.

[11] 4,213,727
[45] Jul. 22, 1980

[54] DRUM HANDLING APPARATUS

[75] Inventor: Charles H. Lighthipe, Jr., Pompey, N.Y.

[73] Assignee: Morse Manufacturing Company, Inc., East Syracuse, N.Y.

[21] Appl. No.: 968,207

[22] Filed: Dec. 11, 1978

[51] Int. Cl.$^2$ ............................................. B65G 65/24
[52] U.S. Cl. .................................... 414/420; 414/738
[58] Field of Search ............................... 414/419–421, 414/448, 449, 729, 732, 738, 783, 785

[56] References Cited

U.S. PATENT DOCUMENTS

| | | | |
|---|---|---|---|
| 1,379,472 | 5/1921 | Morgan et al. | 414/738 |
| 2,267,355 | 12/1941 | Van Riper | 414/420 |
| 2,570,741 | 10/1951 | Zeh | 414/738 |
| 2,775,359 | 12/1956 | Carpenter | 414/785 X |
| 3,112,835 | 12/1963 | Gierhart | 414/420 |
| 3,191,788 | 6/1965 | Hopfeld | 414/420 |
| 3,206,052 | 9/1965 | Kennedy | 414/420 |
| 3,587,892 | 6/1971 | Vermette | 414/420 |
| 3,623,620 | 11/1971 | Vermette | 414/420 |
| 3,734,304 | 5/1973 | Cabaniss | 414/732 |
| 4,084,706 | 4/1978 | Russell | 414/421 X |

Primary Examiner—L. J. Paperner
Assistant Examiner—Terrance L. Siemens
Attorney, Agent, or Firm—Bruns & Jenney

[57] ABSTRACT

Apparatus for lifting, repositioning and transporting relatively large storage drums that includes a carriage containing a movable frame in which is pivotably supported an open ended drum saddle. The saddle is made up of two parallel side rails joined together by a back rail. The distance between the side rails is less than the diameter of the drum whereby the drum can be cradled in a horizontal rest position within the saddle with one of its planar end walls seated against the back rail of the saddle and its cylindrical side wall resting between the two side rails. A cinching mechanism acts in cooperation with the saddle to securely lock the drum to the rails. In operation, adjustment of the frame and the saddle is accomplished independently to permit a drum to be lifted from either a horizontal or vertical rest position and brought to any desired secondary position within the operating range of the apparatus.

11 Claims, 5 Drawing Figures

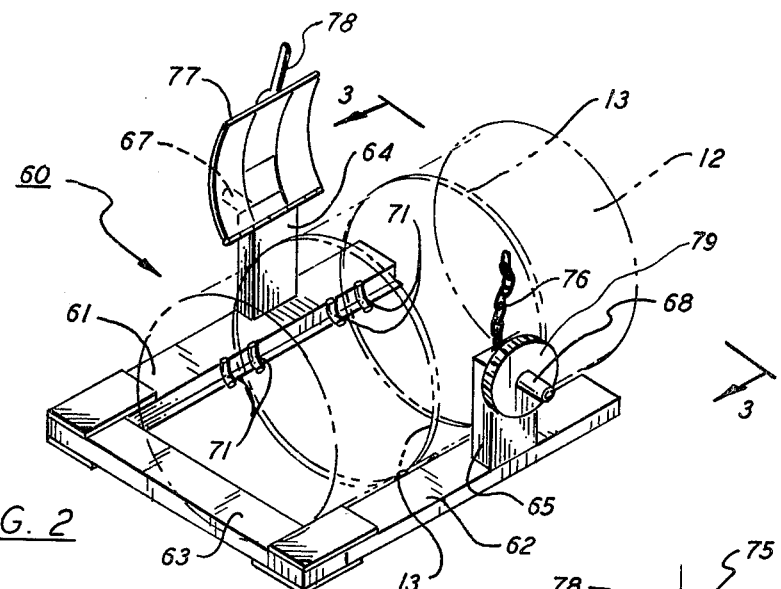
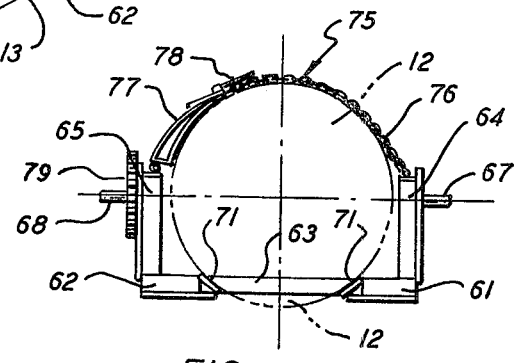
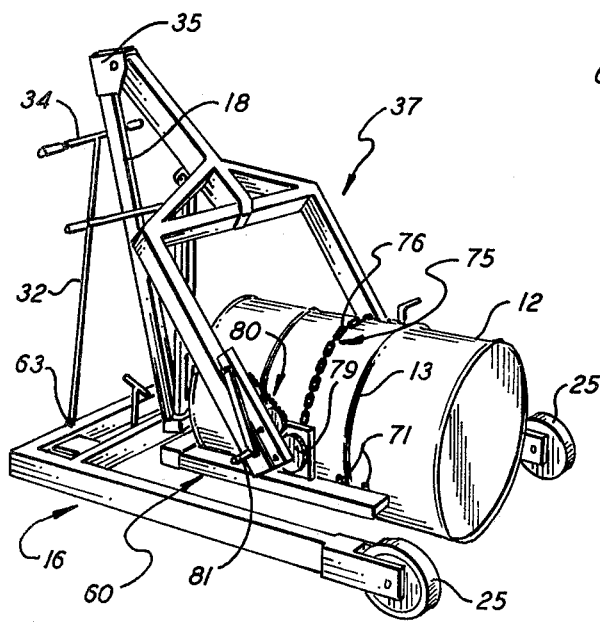
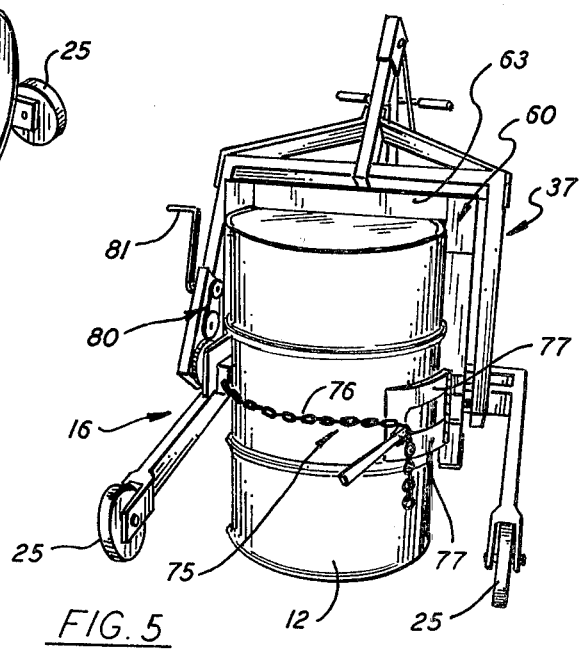

DRUM HANDLING APPARATUS

BACKGROUND OF THE INVENTION

This invention relates to an improved drum handling device and, in particular, to a drum handling apparatus that is capable of lifting a drum from either a horizontal or a vertical rest position and easily and efficiently bringing the drum to a new location or position.

The most pertinent prior art known to the applicant at the time of filing the present application is to be found in U.S. Pat. Nos.:

| | | |
|---|---|---|
| 2,645,372 | 2,971,662 | 3,438,523 |
| 2,755,949 | 3,112,835 | 3.522.893 |
| 2,756,883 | 3,191,788 | 3,587,892 |
| 2,832,630 | 3,206,052 | 3,623,620 |

Many liquid or semi-liquid materials, such as chemicals, oils and the like, are placed in cylindrical drums to facilitate both handling and storage of the materials. Typically, the drums are relatively large and some type of equipment is required to lift and move the drums about. As illustrated in many of the above-noted patents, most drum handling devices involve relatively bulky and complex mechanisms that are difficult to operate and costly to build and maintain.

A further disadvantage associated with many of the prior art devices, relates to their inability to pick up a drum while it is seated in a horizontal rest position. The term horizontal rest position, as herein used, refers to a drum that is resting on its cylindrical wall with its central axis lying generally in a horizontal plane. Similarly, the term vertical rest position is herein used to define a drum that is resting upon one of its planar end walls with the axis thereof being generally situated within a vertically aligned plane. Basically most of the prior art devices engage the drum through means of a sling or a girdle that is arranged to completely encompass the drum cylinder. As a consequence, these devices are unable to effectively grasp a drum while it is resting in a horizontal position. In light of the fact that drums of this nature are some times stored horizontally or are turned in a mixer or blender while similarly positioned upon rollers or the like, the overall usefulness of these prior art devices is seriously curtailed.

Those devices which are able to engage a drum while it is situated in a horizontal rest position are usually equipped with contoured jaws that are adapted to swing over the drum and clamp about its cylindrical body. As can be seen, the jaws and the associated drive mechanism comprise a relatively large assembly requiring a good deal of overhead clearance in order to effectively engage the drum. As a consequence, this type of equipment does not lend itself for use in restricted or confined areas.

SUMMARY OF THE INVENTION

It is therefore an object of the present invention to improve apparatus for handling large drums used in shipping and storing various materials.

A further object of the present invention is to provide a relatively simple and compact drum-handling device that is capable of lifting relatively large cylindrical drums from a horizontal rest position and moving said drums to a remote location.

A still further object of the present invention is to provide a relatively simple drum-handling device that can lift a drum from either a vertical or a horizontal rest position and reposition the drum in an infinitely large number of secondary positions.

Another object of the present invention is to provide highly flexible drum-handling apparatus that requires a minimum amount of space in which to operate.

Yet another object of the present invention is to extend the operating range of a drum-handling device for both lifting, repositioning and transporting relatively large storage drums.

These and other objects of the present invention are attained by means of a drum-handling device having a movable carriage containing a positionable bifurcated frame in which is pivotably supported an open-ended saddle. The saddle includes two parallel side rails which are cojoined by means of a back rail. The distance between the two side rails is less than the diameter of a drum being handled so that the drum can be cradled lengthwise within the saddle with one end wall of the drum abutting the back rail of the saddle and the cylindrical end wall thereof resting against its two side rails. An adjustable sling acts in conjunction with the saddle to lock the drum to the rails. In assembly, both the frame and the saddle can be independently adjusted whereby either horizontally or vertically aligned drums can be easily engaged and brought to a new position or location.

BRIEF DESCRIPTIONS OF THE DRAWINGS

For a better understanding of these and other objects of the present invention reference is had to the following detailed description of the invention which is to be read in conjunction with the following drawings, wherein:

FIG. 2 is a slightly enlarged perspective view of the drum saddle employed in the drum-handling device shown in FIG. 1 showing further details thereof;

FIG. 3 is an end view of the saddle taken along lines 3—3 in FIG. 2 showing a drum cradled within the saddle rails;

FIG. 4 is another perspective view of the present drum-handling apparatus showing the saddle inserted beneath a horizontally aligned drum resting upon the surface of the floor; and FIG. 5 is yet another perspective view of the instant drum-handling apparatus showing the saddle secured to a drum that is seated in a vertical rest position upon the surface of the floor.

DESCRIPTION OF THE INVENTION

Figure 1:
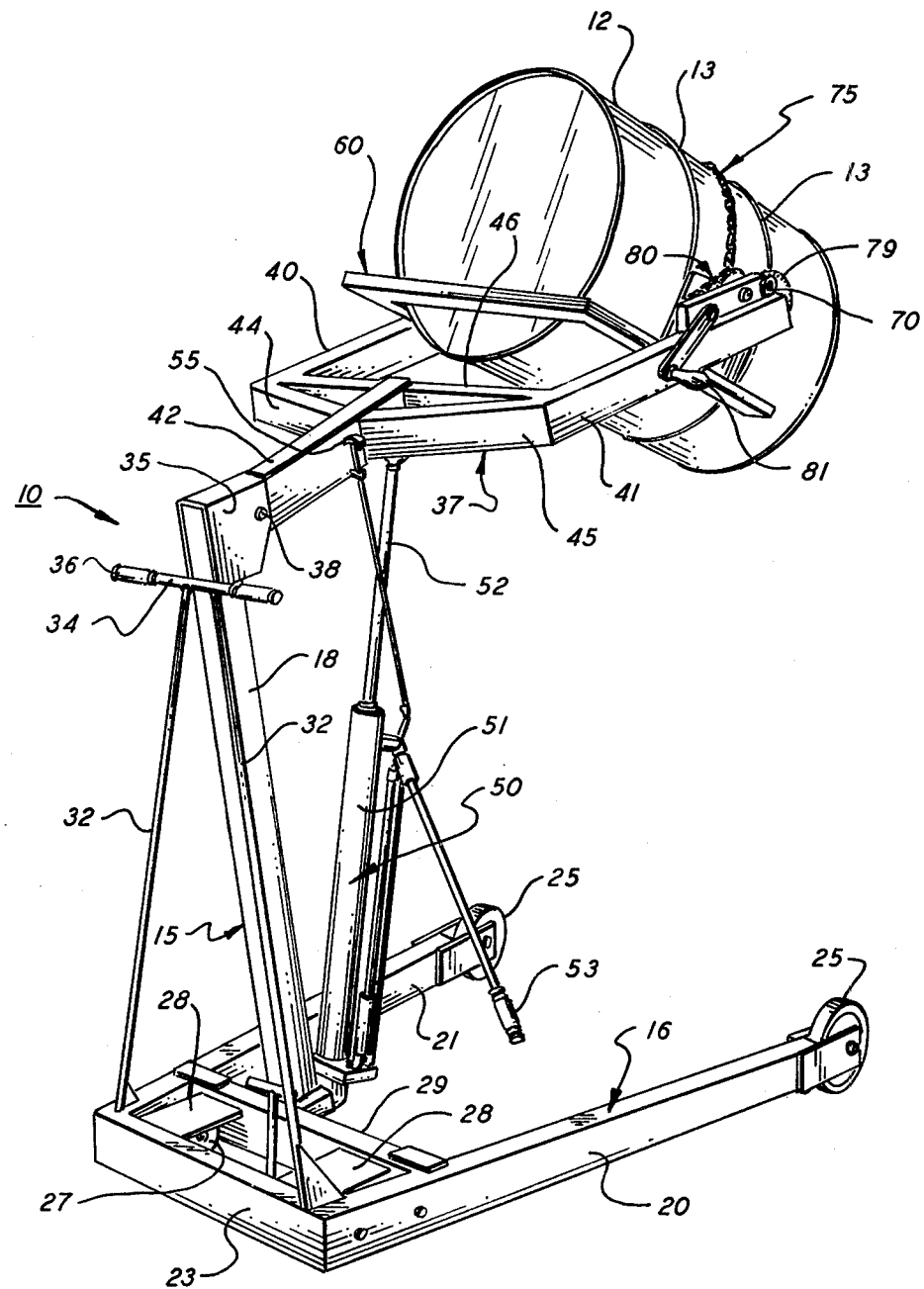
FIG. 1 is a perspective view of a drum-handling device embodying the teachings of the present invention showing a drum locked within the saddle and being supported by the frame some distance above the floor.

Referring initially to FIG. 1, there is illustrated a drum-handling apparatus, generally referenced 10, for lifting, positioning and transporting cylindrical drums. Although the apparatus of the present invention is well suited to handle a wide variety of drums as typically used in industry, the invention will be described with reference to a relatively large drum 12 having a pair of spaced apart chines 13—13 encircling the body section thereof. The drum-handling apparatus 10 generally includes a carriage 15 formed of a welded chassis 16 upon which is securely affixed a vertically extended post or mast 18. The chassis contains two diverging horizontal legs 20, 21 that are cojoined at their proximal ends at the front of the carriage by means of an end member 23. A fixed rubber wheel 25 is rotatably supported at the extended distal end of each horizontal leg. Smaller swivel casters, such as the caster 27 shown in FIG. 1, are mounted at the front of the carriage which allows the carriage to be easily and conveniently rolled across the floor as well as manoeuvred into confined or restricted areas. The casters are located directly below plates 28—28 that extend between end member 23 and cross brace 29.

The vertical mast 18 is affixed at its base to the cross brace, as for example by welding, so as to support the mast in a generally upright position. Further support is given to the mast by means of two raised support rods 32—32. The rods are welded to the chassis at their lower ends and are connected to the mast at the upper ends by means of a horizontally aligned handlebar 34. The handlebar is provided with a pair of grips 36 by which the chassis can be conveniently manoeuvred.

The upper end of the mast contains a corner joint 35 in which a bifurcated frame 37 is pivotably mounted by means of pivot pin 38. The bifurcated frame is also a welded section and includes two extended arms 40 and 41 that are secured to a central support element 42 by means of angle braces 44 and 45. A stiffener 46, which extends between the two outstretched arms of the frame, is also provided to add strength and stability to the frame.

Movement of the frame about the pivot pin is regulated by means of a hydraulic ram 50. Cylinder 51 of the ram is pivotally affixed to the carriage at the base of the mast while the extendable arm 52 of the ram is similarly pivotally secured to the central body element of the frame a given distance from the pivot point of pin 38 to provide sufficient mechanical advantage to the system to permit the ram to efficiently raise and lower the frame. Pumping jackhandle 53 forces oil into the cylinder, causing the arm to be extended and thus raising the frame. A control knob 55 is operatively connected to the cylinder for regulating the positioning of a release valve (not shown). Opening the valve allows oil to be bled from the cylinder which in turn allows the extended arm to be retracted into the cylinder thereby lowering the frame.

Referring now more specifically to FIGS. 2 and 3, an open-ended saddle 60 is pivotally mounted between the arms of the bifurcated frame enabling the saddle to be rotated independently within the frame member. In practice, the saddle is made up of two parallel side rails 61, 62 that are cojoined in assembly by means of a back rail 63. Posts 64 and 65 depend upwardly from the top surface of each side rail and are adapted to support axially aligned trunnions 67, 68 therein. The trunnions are securely locked to the post and the free ends thereof are supported in assembly within bearing blocks 70 (FIG. 1) carried in the outboard ends of the two arms of the frame.

The lateral distance between the two side rails of the saddle is less than the diameter of the drum being handled. Accordingly, the side rails of the saddle can be slipped under a horizontally positioned drum and brought up into contact with the cylindrical body thereof to seat the drum lengthwise between the rails. The end rail of the saddle is brought into abutment with one of the end walls of the drum to securely cradle the drum therein. Contoured tabs 71 are welded to the inner side wall of each side rail to provide mounting surface upon which the drum rests. The tabs are welded to the rails in pairs with each pair straddling one of the drum chines. The tabs coact to prevent excessive longitudinal shifting of a drum that is cradled upon the rails.

Once the drum is properly seated upon the saddle, it is locked in place by means of an adjustable sling 75 (FIG. 3) that can be of any suitable design as known and used in the art. The present sling consists of a chain 76 that is secured to post 64 and a cinching device 77 that is hinged to the opposite post 65. The cinching device includes a lever operated pawl and ratchet mechanism 78 mounted upon the hinge plate 79. The cinch is arranged to engage the chain and to draw the chain tightly about the upper body of the drum with sufficient holding power to lock the drum securely in place against the saddle rails.

A spur gear 79 is keyed or otherwise secured to trunnion 68 whereby the saddle is caused to turn in unison with the gear. In assembly, the posts are located at about the midlength position of a drum seated upon the saddle. The common axial centerline of the trunnions is also arranged so that it passes through the central axis of the drum. As a result of this arrangement, the drum is delicately balanced on the saddle between the arms of the bifurcated frame whereby rotation of the gear produces an equal amount of rotation of the drum. The spur gear is connected by a pinion (not shown) to a chain and sprocket drive assembly 80 mounted in the adjacent arm 41 of the frame. The drive assembly is powered by a hand crank 81, although any suitable drive means may be substituted therefor without departing from the teachings of the present invention. The sprocket drive is adapted to rotate the spur gear, and thus the drum saddle, through a full 360 degrees of rotation. By use of the saddle drive and the independently adjustable frame drive cylinder, the drum can be moved to any one of an infinite number of positions upon the carriage.

Referring now more specifically to FIG. 4, the apparatus of the present invention is shown adjusted to a condition wherein it can conveniently lift a drum resting in a horizontal position from the surface of the floor. As illustrated, the bifurcated frame is brought to full down position and the saddle then adjusted to a generally horizontal position. The carriage is simply wheeled up to the drum with the side rails being slipped beneath the drum and the back rail arrested against the front end wall thereof. The side rails are now moved up into contact with the body of the drum and the drum secured to the saddle by drawing down upon the sling assembly 75. Once secured within the saddle, the drum can be raised to a higher elevation and transported via the carriage 16 to a different or remote location. It should be clear from the disclosure above that the drum can also be deposited while in a horizontal position upon a storage shelf or upon the rollers of a mixing or blending machine. Similarly the present apparatus is ideally suited to bring the drum to a slightly tilted position to facilitate pouring of liquids from the drum into a separate container.

FIG. 5 further illustrates the apparatus of the present invention arranged to lift a drum that is seated in a vertical rest position upon the surface of a floor or the like. Here, the saddle 60 is dropped vertically over the drum so that the back rail 63 of the saddle is resting in contact against the drum's upper end wall. The sling is drawn tight against the body of the drum to secure the drum within the saddle. Once again, by use of the independent frame and saddle drive mechanisms, the drum can be swung into any desired position and transported on the carriage to a new location.

Although the present invention has been explained with reference to a gear and sprocket drive mechanism for turning the saddle within the frame, it should be understood that any suitable rotating means may be similarly employed and while this invention has been disclosed with reference to the structure disclosed herein, it is not confined to the details as set forth and this application is intended to cover any modifications or changes that come within the scope of the following claims.

I claim:

1. Apparatus for use in a drum lifting and handling mechanism including
   a bifurcated frame,
   a saddle having two parallel side rails cojoined by a rear rail, the distance between the two side rails being less than the diameter of a drum to be handled whereby the side rails may be passed axially beneath a horizontally resting drum to arrest the back rail against one end wall of the drum and cradle the cylindrical wall of the drum between the two side rails,
   a pair of opposed posts depending upwardly from each side rail,
   an adjustable sling affixed to each of the posts for encompassing the upper portion of a drum seated in said saddle, said sling having a locking means associated therewith for tightening the sling against the drum to secure said drum within said saddle,
   a pair of axially aligned trunnions depending outwardly from the posts that are rotatably supported in the arms of the bifurcated frame whereby the saddle can be rotated within said frame.

2. The apparatus of claim 1 wherein said side rails further include contoured seats secured to the inner side walls thereof for contacting the cylindrical wall of a drum mounted in said saddle.

3. The apparatus of claim 1 further including control means for adjustably positioning the bifurcated frame.

4. The apparatus of claim 1 that further includes rotating means having
   a gear affixed to one of the saddle trunnions
   a drive mounted upon the frame and being operatively connected to the gear by a sprocket and chain mechanism, and
   a crank rotatably supported in the frame for providing input power to said drive.

5. The apparatus of claim 1 wherein the trunnions are located in said posts at a height above the rails so that the axial centerline therefor passes through the central axis of a drum seated within said saddle.

6. The apparatus of claim 5 wherein said posts are situated upon said rails at about the midlength position of a drum seated within said saddle.

7. The apparatus of claim 3 further including a carriage for transporting said frame.

8. In a drum handling device of the type wherein a wheel mounted carriage has a bifurcated frame pivotably supported therein and further includes an adjustable positioning means acting between the carriage and the frame for positioning said frame within the carriage, the improvement comprising
   a saddle having two parallel side rails that are cojoined by a back rail, the distance between the side rails being less than the diameter of the drum being handled whereby the side rails may be passed axially beneath a horizontally resting drum to arrest the back rail of the saddle against one end wall of the drum and to cradle the cylindrical wall of the drum between the two side rails,
   an adjustable sling affixed to each of the side rails for girdling the upper portion of a drum seated in said saddle and locking said drum against the rails of said saddle,
   a pair of axially aligned trunnions extending outwardly from the side rails of the saddle that are arranged to be rotatably supported in the arms of the bifurcated frame whereby the saddle can be rotated within said frame,
   rotating means connected to the saddle for rotating the saddle between the arms of said frame.

9. The improvement of claim 8 that further includes a pair of opposed posts depending upwardly from said side rail in which are mounted said trunnions at an elevation above the rails such that the coaxial centerline of the trunnions passes through the central axis of said drum.

10. The improvement of claim 8 wherein said rotating means is a crank operated sprocket and chain drive mechanism mounted upon the frame that is adapted to turn a gear affixed to one of said trunnions.

11. The improvement of claim 8 which further includes a series of contoured seats secured to the inner sidewall surfaces of the rails for contacting the cylindrical wall of a drum seated within said saddle.

* * * * *